May 14, 1957   JEAN-MARIE MOULON   2,792,553
NEGATIVE IMPEDANCE DEVICE

Filed July 15, 1953   5 Sheets-Sheet 1

May 14, 1957    JEAN-MARIE MOULON    2,792,553
NEGATIVE IMPEDANCE DEVICE

Filed July 15, 1953    5 Sheets-Sheet 3

May 14, 1957  JEAN-MARIE MOULON  2,792,553
NEGATIVE IMPEDANCE DEVICE
Filed July 15, 1953                                5 Sheets-Sheet 4
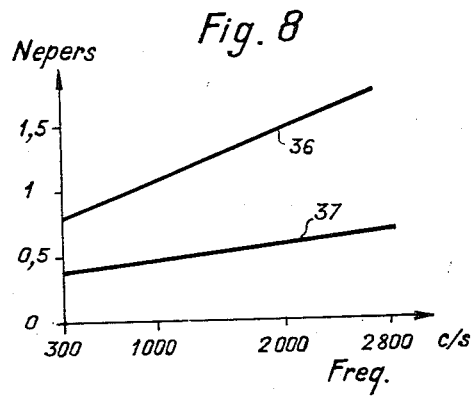
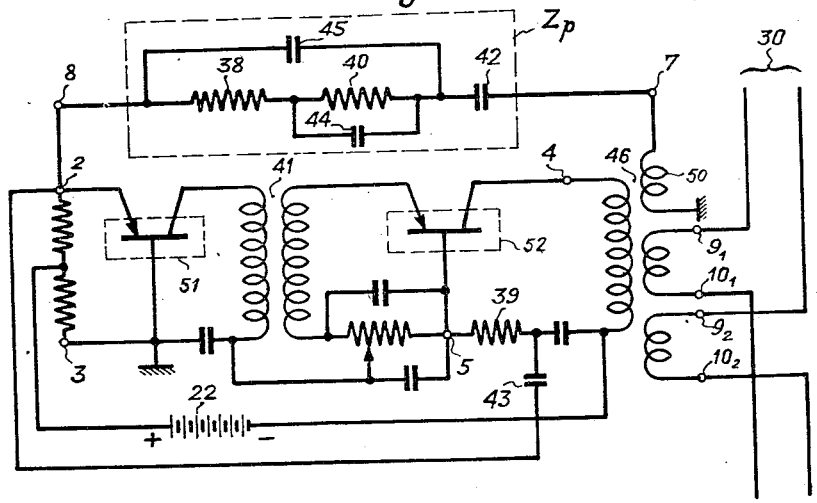
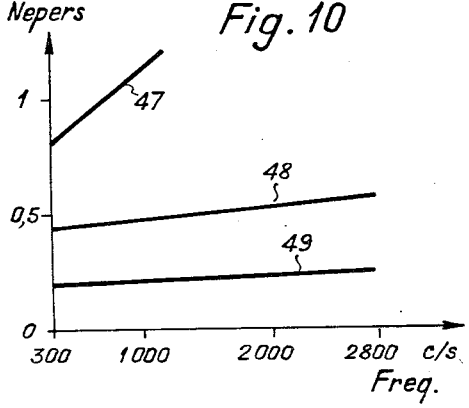

United States Patent Office 2,792,553
Patented May 14, 1957

2,792,553

NEGATIVE IMPEDANCE DEVICE

Jean-Marie Moulon, Paris, France

Application July 15, 1953, Serial No. 368,187

Claims priority, application France September 19, 1952

6 Claims. (Cl. 333—80)

The present invention relates to negative impedance devices constituted by assemblies of passive elements, consisting of inductances, resistances, capacities and transformers, and active elements constituted by an amplifier, the mode of assembling being such that the values of said impedances depends only, practically, on those of the passive elements, this result being obtained with as high an accuracy as may be desired.

One object of the invention is, more particularly, to obtain negative impedances which can be used as two-way amplifiers for two wire telephone circuits, their amplification properties depending practically only on the passive elements they include but of course the use of negative impedances in accordance with the invention is not limited to this application.

Negative impedances are already known, consisting of a network of passive impedances, i. e. having a positive real component, associated with an amplifier equipped with a negative feedback path and a positive feedback path, both being parts of said network, the arrangement of the assembly being such that when a given passive impedance is placed between two terminals provided to this effect in the network, there appears between two other terminals in the same network a negative impedance whose value is equal to the product of said given passive impedance multiplied by a negative numerical factor of a practically constant value in a given frequency band.

The negative impedance which is an object of this invention essentially comprises an amplifier which may be of any type, provided its gain is high enough (its minimum value shall be defined hereinafter), and a network of passive impedances coupling the input and output of the amplifier and comprising two feedback paths such that, for one end at least of the amplifier, one of the feedbacks be of the series type while the other one is of the shunt type, one of said feedbacks being positive, and the other one negative, the change in sign between the two feedbacks being obtained by the use of a transformer causing a phase rotation of 180°, hereinafter called a "phase-reversing transformer." Two pairs of terminals are chosen in the network, so that there be no feedback when these two pairs of terminals are open and so that if a passive impedance is connected to any one of the pairs of terminals, the fact of short-circuiting or opening the other one changes the sign of the total feedback applied to the amplifier one of the feedback paths being then cut or at a disadvantage the other one, on the contrary being favourably affected.

In the use of the negative impedance according to the invention, as a repeater for a two-wire telephone circuit, a passive impedance is connected to one of these pairs of terminals and the other pair of terminals is connected in series with the two-wire circuit. The negative impedance is obtained between the two terminals of the latter pair.

The invention will be described in detail hereinafter, with reference to the appended drawings, wherein:

Figure 8 shows the curve for the transmission equivalent of a circuit 10 kilometers long, consisting of two round copper wires 0.6 mm. in diameter equipped with a repeater of the type shown in Figure 6;

Figure 9 shows, in detail, a negative impedance repeater of the type shown in Figure 1; and Figure 10 shows the transmission equivalent curves of a circuit 10 kms. long (the same as for Figure 7), equipped with one or two repeaters of the type shown in Figure 9.

Figure 1:
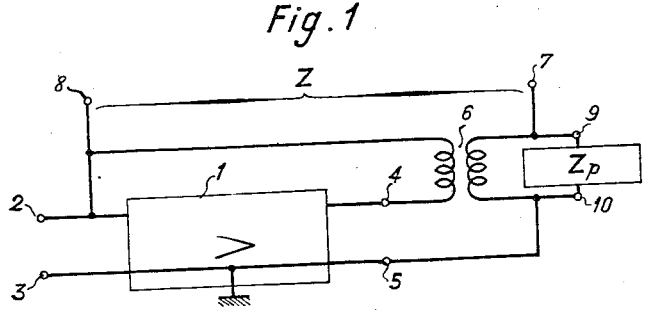
Figures 1 and 2 show, diagrammatically, two different forms of the amplifier and the feedback paths, the assembly of which constitutes the negative impedance.

Referring to Figure 1, 1 designates an amplifier, the direction of amplification of which is indicated by an arrow. Its input terminals are designated by 2—3, and its output terminals by 4—5. Terminals 3 and 5 are connected to ground. The primary winding of a transformer 6 is connected between terminals 2 and 4. The output terminals of the secondary winding of the transformer 6 are designated by 9 and 10. A passive impedance $Z_p$ is connected between the terminals 9—10. The desired negative impedance Z appears between the terminals 7—8 connected respectively to the terminals 9 and 2. The functions of impedances Z and $Z_p$, i. e. of the pairs of terminals 7—8 and 9—10 may be interchanged.

The transformer 6 is a phase reversing transformer, i. e. the directions of its primary and secondary windings are such that the voltages between the terminals 4 and 2 on the one hand and 9 and 10 on the other hand, are opposite in phase.

The primary winding of the transformer 6, connected between 2 and 4 constitutes a feedback path of the series type fed from the output of the amplifier, since it brings back the output current thereof at its input. If the terminals 9—10 are in open circuit (impedance $Z_p$ infinite) the primary winding does not pass any current and the series feedback path is cut.

The secondary winding of the transformer 6 and the impedance $Z_p$, when it is connected to the terminals 7—8 constitute a shunt type feedback path fed from the output of the amplifier. If the terminals 7—8 are in open circuit (impedance $Z_p$ infinite) this shunt feedback path is cut.

When the terminals 9—10 are short-circuited (impedance $Z_p$ zero), the primary winding of the transformer 6 passes current easily and the series feedback is strong, while terminal 7 being connected to "ground" i. e. to the common point 3—5 at the input and output of the amplifier through the short circuit 9—10 no shunt feedback is applied back to the amplifier's input through an external circuit which would be connected to terminals 7—8.

When terminals 7—3 are short circuited (impedance $Z_p$ connected to the latter terminals and of zero value) the shunt feedback is large and predominates over the series feedback.

The series and shunt feedbacks being of opposite signs, it may be seen that an impedance being connected to one pair of terminals (7—8) or (9—10) the feedback changes sign according to whether the other pair of terminals is short-circuited or open-circuited.

The feedback has the sign of the series feedback when the terminals 9—10 are short-circuited or the terminals 7—8 open circuited, and it has the sign of the shunt feedback when the terminal 9—10 are open circuited or the terminals 7—8 short-circuited. The absolute sign of each one of the feedbacks depends on the phase shift existing between the input voltages in the amplifier.

Figure 2:
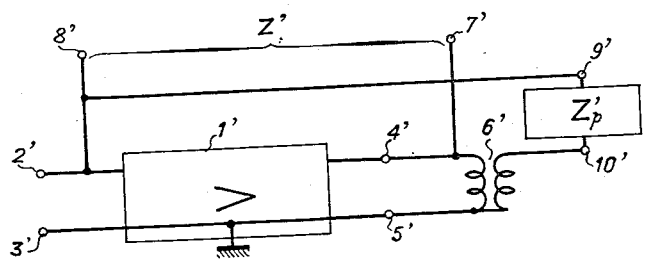

Figure 2 differs from Figure 1 only in that the shunt type feedback is taken directly from the output terminals of the amplifier 1', the series type feedback being taken now after the phase reversing transformer 6'. The various elements in Figure 2 are designated by the same reference numerals as those in Figure 1 but these reference numerals are primed.

The properties of the two forms of the invention are comparable as to principle and results; only questions of practical embodiment concerning particularly the phase shifting signal between the input and output of the amplifier used and the stability outside the frequency band occupied by the signals to be amplified can lead to choosing one form in preference to the other one.

Theory shows (see for instance "Formules Générales des Amplificateurs à Réaction" by François Job in "Annales des Télécommunications" for December 1948, page 439, Theorem III) that the impedance seen between two terminals of a network comprising an amplifier and a feedback network can be written:

(1) $$Z = Z_{SR} \frac{\tau_{cc}}{\tau_{co}}$$

where $\tau_{cc}$ and $\tau_{co}$ are the values of the feedback rates existing when the two terminals from which the network impedance is seen are respectively short circuited and open circuited, and where $Z_{SR}$ represents the impedance seen from the same terminals in the same network without any feedback defined as follows: The amplifier network is disconnected, at its input for instance, and an impedance equal to the input impedance to the amplifier is connected to the terminals of said network, previously connected to the input to the amplifier.

Figure 3:
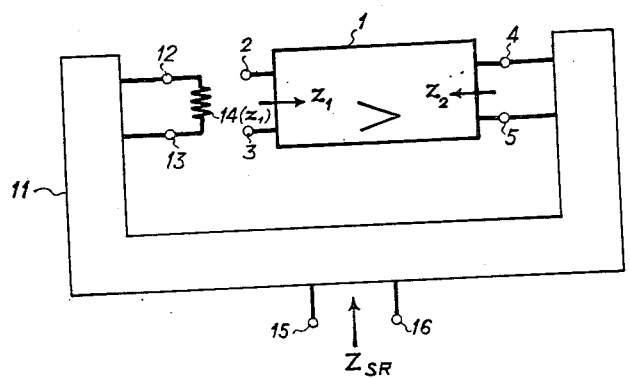
Figures 3 and 4 are diagrams for explaining the method for the design of the negative impedance.

The feedbackless network is represented in Figure 3 where, as in Figure 1, 1 designates the amplifier, 2—3 its input terminals, 4—5 its output terminals. A reaction network 11 is connected, on one side to the terminals 4—5 of the amplifier 1. The terminals 12—13 of the network 11, instead of being connected to the input terminals 2—3 of the amplifier 1, are connected to an impedance 14 having a value equal to $z_1$, which is the value of the input impedance of the amplifier. When viewed, in direction of arrow, the impedance $Z_{SR}$ will appear across the terminals 15 and 16.

Figure 5C:
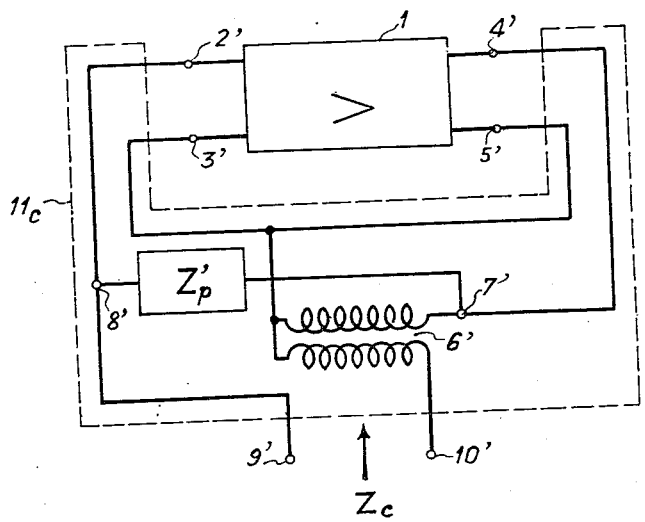
Figures 5a, 5b, 5c, 5d show, diagrammatically, the structures of the negative impedance.
Figure 5D:
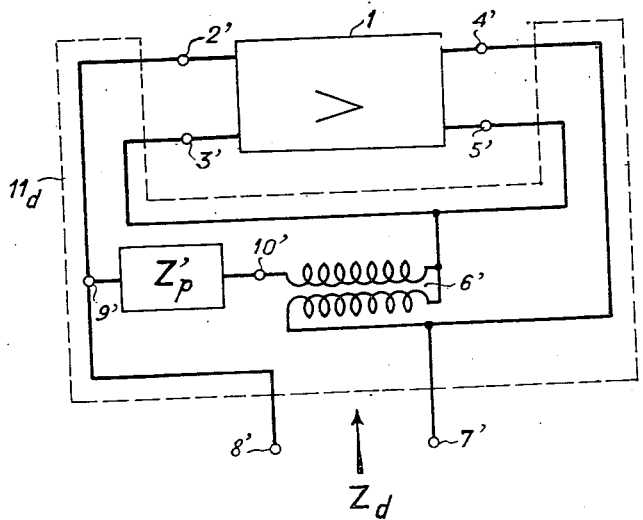
Figure 5A:
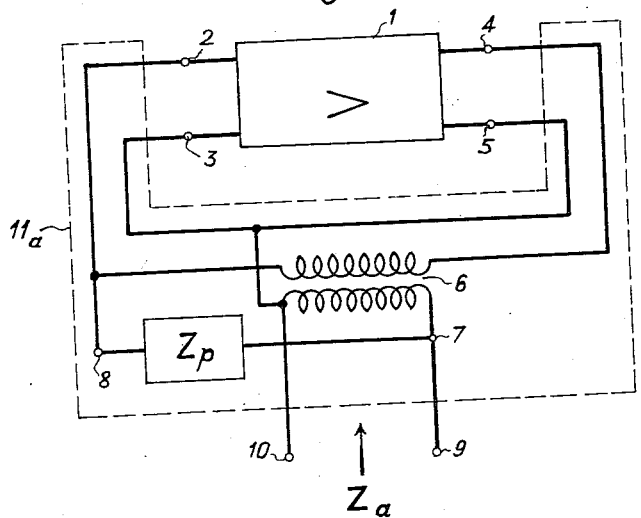
Figure 5B:
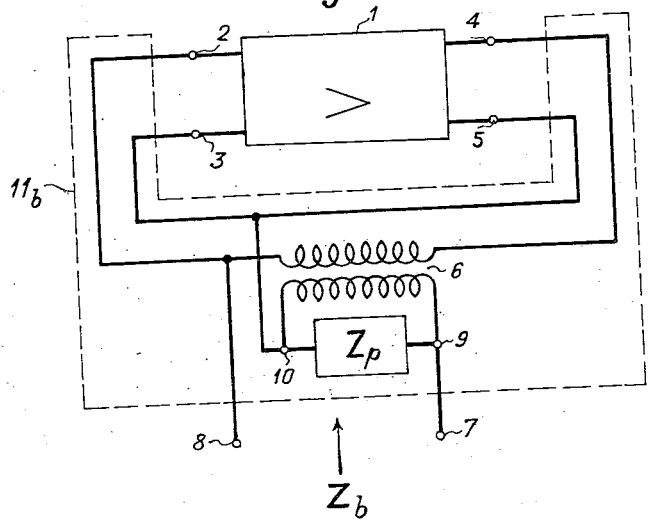

The structure of the network 11 is represented respectively at 11a, 11b, 11c, 11d in Figures 5a, 5b, 5c, 5d. Figures 5a and 5b relate to Figure 1 where terminals 15—16 are respectively the terminals 9—10 and 7—8 of that Figure and Figures 5c and 5d relate to Figure 2 where the terminals 15—16 are respectively terminals 9'—10' and 7'—8' in the latter figure.

From terminals 15—16 in Figure 3, there is seen, since the feedback is suppressed, the "feedbackless impedance" with a value $Z_{SR}$. $\tau_{cc}$ and $\tau_{co}$ are the values of the feedback rates when terminals 15—16 are respectively short-circuited and open-circuited. It is known that the feedback rates are expressed by:

$$\tau_{cc} = 1 - mb_{cc}$$
$$\tau_{co} = 1 - mb_{co}$$

where $m$ is the voltage gain of amplifier 1 and $b_{cc}$ and $b_{co}$ the respective values of the transfer functions of the feedback network 11 taken between impedances equal to the output impedances $z_2$ and input impedance $z_1$ of the amplifier when the terminals 15—16 are short-circuited or open-circuited.

Expression 1 may be written:

$$Z = Z_{SR} \frac{1 - mb_{cc}}{1 - mb_{co}}$$

and the latter expression, when the gain $m$ becomes sufficiently high, approaches (2) $$Z = Z_{SR} \frac{b_{cc}}{b_{co}}$$

Z is of opposite sign to $Z_{SR}$ since $b_{cc}$ and $b_{co}$ are opposite in signs, since, as already seen, the fact of short-circuiting or open-circuiting the terminals 15—16 changes the sign of the feedback. Further, Z practically no longer depends on the gain $m$ when the latter is large enough, which, practically occurs with gains of the order of 20 to 30 decibels, which are easy to obtain for the man of the art. In what follows, it will be assumed that the gain $m$ is high enough to allow the use of approximation (2) above.

Figure 4:
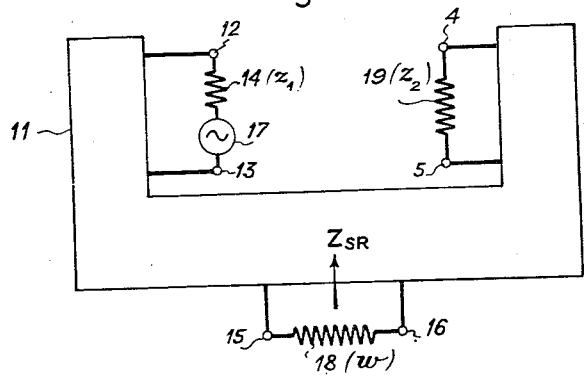

There remains to show that Z does not depend either on the impedances $z_1$ and $z_2$ of the amplifier, although $Z_{SR}$, $b_{cc}$ and $b_{co}$ individually depend on these impedances. Consequently, the value of the transfer function of the feedback network 11 (Figure 4) must be calculated by placing a load impedance 19, with a value $z_3$ between the terminals 4—5, a generator 17 with an internal resistance 14 equal to $z_1$ between the terminals 12—13 and an impedance 18 with a value $w$ between the terminals 15—16.

There results, from the linear properties of the nework (see H. W. Bode, "Network Analysis and Feedback Amplifier Design," D. Van Nostrand Co., New York, 1945, formula 10–24, p. 223), that the value of the transfer function hereinabove referred to may be written:

$$b = \frac{Mw + N}{Pw + Q}$$

where M, N, P, Q, are functions of frequency and of the values of the impedances constituting the network but do not depend on $w$. Therefore, $b$ may be written:

(3) $$b = \frac{Z_{SR} b_{cc} + w b_{co}}{Z_{SR} + w}$$

an expression which does give:

$$b = b_{cc} \text{ for } w = w_{cc} = 0$$

$$b = b_{co} \text{ for } w = w_{co} = \infty$$

$$b = co \text{ for } w = -Z_{SR} \quad (4)$$

$$b = 0 \text{ for } w = w_0 = -Z_{SR} \frac{b_{cc}}{b_{co}} \quad (5)$$

The equalities (4) express the fact that $Z_{SR}$ being the impedance seen from the terminals 15—16, having $w$ approach $-Z_{SR}$ amounts to having the network self-oscillating.

A comparison of expressions (2) and (5) shows that $$Z = -w_0$$

and that provided the gain of the amplifier is high enough, the impedance offered by the network between the terminals 15—16 has the value of the impedance which, with a changed sign, and connected to the terminals 15—16 would make the transfer function zero for the feedback network 11 of the amplifier.

The value of $w_0$ is obtained by equating to zero the transfer function (3). Now since the zero transfer condition between two pairs of terminals of a network is independent of the terminating impedances connected to said pairs of terminals, the value of $w_0$ and, consequently that of Z are independent of $z_1$ and $z_2$.

In the case of Figure 1, the numerator of the transfer function may be written:

$$Z + (1 - n) Z_p$$

where $n$ designates the ratio between the number of turns in the primary winding 4—2 of the transformer 6 and the number of turns in the secondary winding 9—10.

If, as in the case of Figure 5a, the impedance $Z_p$ is connected with the terminals 7—8 of the network 11a, there will be seen, at terminals 9—10, an impedance $$Z_a = -\frac{Z_p}{n-1}$$

which is negative when $n$ is larger than unity.

If, as in the case of Figure 5b, the impedance $Z_p$ is connected to terminals 9—10 of the network 11b, there will be seen, at terminals 7—8 an impedance $$Z_b = -(n-1)Z_p$$

which is negative if $n$ is larger than unity.

In the case of Figure 2b, the numerator of the transfer function may be written:

$$Z' - nZ'_p$$

If, as in the case of Figure 5c, an impedance $Z'_p$ is connected to the terminals 7'—8' of the network 11'c, there will be seen, at terminals 9'—10', a negative impedance $$Z_c = -\frac{Z'_p}{n}$$

If, finally, as in the case of Figure 5d, an impedance $Z'_p$ is connected to the terminals 9'—10' of the network 11'd, there will be seen, at terminals 7'—8', a negative impedance $$Z_d = -nZ'_p$$

Impedances $Z_a$ and $Z_c$ on the one hand and $Z_b$ and $Z_d$ on the other hand, differ in that the ones are unstable in short circuit while the other ones are unstable in open circuit, according to the sign of the component of the feedback passing through the terminals from which the negative impedance is seen. For instance, in the case of the networks in Figures 5c and 5d, if we let $n=1$ and if we take the same value for $Z'_p$, in both cases, we shall see the impedance $Z_c = Z'_p$ from terminals 9'—10' (Figure 5c) and $Z_d = Z'_p$ from terminals 7'—8' (Figure 5d). Assuming that the amplifier causes a phase shift of 180° between its input voltage and its output voltage; the fact of short-circuiting terminals 9'—10' (Figure 5c) increases the positive series of feedback and suppresses the negative shunt feedback and the network starts oscillating while the fact of open circuiting terminals 9'—10' suppresses the positive series feedback and the network is stable. Conversely, in Figure 5d, the terminals 7'—8' being short-circuited, the negative feedback is maximum and stabilizes the network, while if the terminals 7'—8' are open circuited, there is no longer any negative feedback and the positive feedback causes the network to oscillate. It may be stated that $Z_c$ is stable in open circuit and that, on the contrary, $Z_d$ is stable in short circuit. If, on the contrary the amplifier did not cause a phase reversal between its input voltage and output voltage, the values of the negative impedances would not be changed but the nature of their stabilities would be changed. $Z_c$ would become stable in short circuit and $Z_d$ stable in open circuit.

The above results are valid, of course, for the useful frequency band of the system. At the ends of this band, the impedance seen from the terminals 15—16 of the network provided with its amplifier becomes positive and precautions should be taken for avoiding a self oscillation of the amplifier at frequencies at which its gain drops or at which the phase reversing transformer 6 or 6' differs more and more from an ideal transformer. In particular the impedances $Z_c$ and $Z_d$, both equal to $(-Z'_p)$ in the case where $n=1$ are effectively so only in that useful band and their representative curves in rectangular coordinates, in the plane of a complex variable, differ outside said frequency band, the one which represents $Z_d$ surrounding the origin of coordinates while leaving the latter to the left (open circuit instability) and the one which represents $Z_c$ surrounding the origin while leaving it to the right (short-circuit instability).

Figure 6:
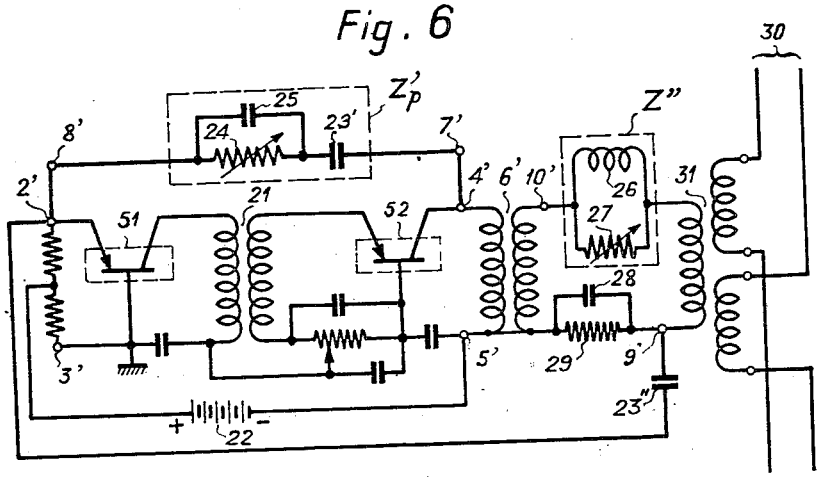
Figure 6 shows, in detail, a negative impedance repeater of the type of Figure 2.

Figure 6 shows a special embodiment of the invention, applicable to the telephone frequency band 300 to 3000 C. P. S.

Referring to that figure, the negative impedance is of the type of Figure 2 and the amplifier 1 consists of two crystal triodes of the type known as "transistors," 51 and 52, coupled through the transformer 21 and energized in series by a voltage source, such as a battery 22. The transformer 21 is a phase reversing transformer, i. e. the voltage at the terminals of its secondary winding is opposite in phase to the voltage at the terminals of its primary winding. Since transistors practically introduce no phase shift between their input voltage and output voltage, it will be seen that the feedback path through the impedance $Z'_p$ is a negative feedback path. The transformer 6' being a phase shifter, the feedback path through the impedance $Z''$ is a positive feedback path. The feedback paths comprise condensers 23' and 23'' for the purpose of cutting off from said paths the D. C. power supply from the battery 22. Their capacity values are chosen high enough for their effect to be negligible above 300 C. P. S.

The impedance $Z'_p$ comprises, in addition to the condenser 23', a resistance 24 and a condenser 25. The impedance $Z''$ comprises the inductance 26 and resistance 27. A condenser 28 and a resistance 29 in parallel connection are inserted in the series feedback path. The condensers 25 and 28 are for the purpose of stabilizing the network at frequencies higher than 3000 C. P. S., at which the amplifier still has an appreciable gain so as to make the impedance offered by the network positive and to avoid self oscillation. The condenser 25 increases the negative feedback since it is in series in the negative feedback path and the condenser 28 decreases the positive feedback since it is in parallel with the positive feedback path. These two condensers have low enough capacity values not to have any appreciable effect above 300 C. P. S.

The resistance 29 acts as a regulator outside the frequency band of the signals to be amplified. It is not involved in the mathematical expression giving the value of the negative impedance; it is placed in parallel with the series feedback path, i. e. in parallel with the input resistance of the amplifier. Since, as it has been seen, the negative impedance does not depend on this input impedance, it is also independent from the resistance 29.

The two-wire line 30, on which the negative impedance is inserted, is coupled with the negative impedance by means of the output transformer 31, each wire of the line being placed in series with one of the two identical secondary windings of the transformer. The impedance offered by the network to the terminals of the output transformer 31 comprises the negative resistance $$-\frac{R}{n}$$

where R is the value of resistance 24 (it has been seen that the condensers 23' and 25 have negligible reactances in the useful frequency band) plus the passive impedance $$\frac{jrL\omega}{r+jL\omega}$$

where $r$ is the value of the resistance, L the value of the inductance 26 and $\omega$ the angular frequency of the signal to be amplified.

Figure 7:
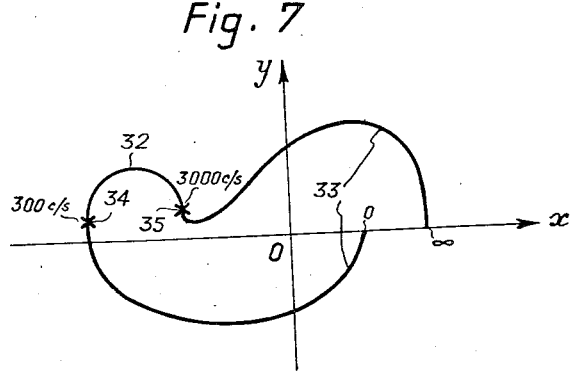
Figure 7 shows the impedance-frequency curve for the repeater of Figure 6.

The impedance $$-\frac{R}{n} + \frac{jrL\omega}{r+jL\omega}$$

may be represented in the complex plane of Figure 7 by a half circle 32 in the band of useful frequencies. Outside this band, the negative impedance no longer has the above value and it is represented by the curve 33. The adjustment for the "impedance-frequency" curve is simple. At 300 C. P. S., the negative impedance is approximately $$-\frac{R}{n}$$

(point 34) an expression which depends only on the adjustment of R. At 3000 C. P. S. the negative impedance has approximately the value $$-\frac{R}{n}+r$$

(point 35), an expression whose value may be adjusted by an adjustment of $r$. The inductance 26 acts only for modifying the distribution of frequencies on the half circle 32.

The device of Figure 6 has been used by the applicant for improving the transmission equivalent of underground lines 0.6 mm. in diameter. The inductance L varies according to the length of the line, between 100 and 500 millihenries; $r$ and $R$ are adjustable resistances with an average value of 5000 ohms. Average values for the other elements are:

Resistance 29 _____ ohms__ 2,500
Condenser 22 _____ microfarads__ 4
Condenser 23 _____ do____ 16
Condenser 25 _____ micro-microfarads__ 2000
Condenser 28 _____ microfarad__ 0.1

Figure 8 shows, at 36, the transmission equivalent curve for a line 10 km. long with no repeater and, at 37, the transmission equivalent curve for the same line comprising a repeater placed at the middle thereof.

In the example of Figure 9, the negative impedance is of the type shown in Figure 1. The amplifier is identical with the amplifier of Figure 6, with the exception that, here, the transformer 41 coupling the two transistors 51 and 52 introduces no phase reversal between the voltages at the terminals of its windings. The feedback paths comprise condensers 42 and 43 for the purpose of stopping said paths to the D. C. power supply for the transistors. The resistance 39 has the same function of regulation outside the frequency band for useful signals as resistance 29 in Figure 6 and the condenser 45 the same function as condenser 25.

The impedance $Z_p$ comprises, in addition to the condensers 42 and 45 whose reactances are negligible in the frequency band of the useful signals, the resistance 38 with a value $R_2$ and the resistance 40 with a value $R_1$, shunted by the condenser 44 having a value $C_1$.

The transformer 46 plays at the same time the part of the transformer 6 in Figure 1 as regards its secondary winding 50 connected between the terminal 7 and ground and the part of the transformer 31 in Figure 6 as regards its secondary windings connected to the terminals $9_1$ and $10_1$ and $9_2$—$10_2$. Each wire of the line 30, whose attenuation it is desired to decrease, is placed in series with one of these latter windings. It will be visible to the man of the art who is familiar with the use of transformers that the impedances connected at $9_1$—$10_1$ or $9_2$—$10_2$ are practically in parallel across the winding 50 with a numerical factor equal to the square of the ratio of voltage transformation. In particular, short-circuiting one of these pairs of terminals is equivalent to short circuiting the winding 50 and consequently to cutting the negative feedback path through $Z_p$ and increasing the positive feedback, the current through the primary winding of 46 being increased.

The negative impedance, each half of which is seen from the terminals $9_1$—$10_1$ and $9_2$—$10_2$, is equal, except for a constant depending on the voltage transformation ratio of the transformer 46 to:

$$-R_2-\frac{R_1}{1+j\omega C_1 R_1}$$

The representative curve for this impedance is similar to that of Figure 7. The abscissa of point 34 depends on the value of $R_1+R_2$ and that of point 35 on the value of $R_2$. The distribution of frequencies on the half circle 32 depends on the value $C_1$ of the condenser 44 which plays a part similar to that of the inductance 26 in Figure 6.

Figure 10 represents, at 47, the transmission equivalent curve for a 10 km. line having conductors 0.6 mm. in diameter, with no repeater, and at 48 and 49, respectively, the transmission equivalent curve for the same line comprising a repeater placed at its mid point and two repeaters placed at the first and second thirds of the line.

For very short line lengths (one to two kilometers), or very long ones (more than 10 kilometers), or when the line is not very uniform, one may be led to a complicating of the impedances $Z_p$ in Figure 9 or $Z'_p$ and $Z''$ in Figure 6 so as to have available, for equalizing the transmission equivalent, a larger number of parameters.

What I claim is:

1. A negative impedance device comprising, in combination, an amplifier provided with input and output terminals and having a gain higher than 20 decibels, a transformer provided with three windings, the first of which is connected through a series resistance to said output terminals, and the second of which is connected through a passive impedance to said input terminals so as to provide negative feedback of the shunt type, while the third of said windings is connected to a utilization circuit for said negative impedance, and means for applying the voltage developed across said resistance to said input terminals so as to provide positive feedback of the series type.

2. A device as claimed in claim 1, wherein said amplifier is a two-transistor stage amplifier, the first stage of which is connected to the second stage thereof through a phase-reversing transformer.

3. A negative impedance device comprising, in combination, an amplifier provided with input and output terminals and having a gain higher than 20 decibels, a first transformer provided with a first and a second windings, the first of which is connected to said output terminals, a passive impedance connecting one end of said first winding to one of said input terminals so as to provide negative feedback of the shunt type, a second transformer provided with a primary and a secondary windings, a circuit connecting said primary winding of said second transformer to said second winding of said first transformer, a series resistance provided in said circuit, means for applying the voltage across said series resistance to said input terminals so as to provide positive feedback of the series type and means for connecting said secondary winding of said second transformer to a utilization circuit for said negative impedance.

4. A device as claimed in claim 3, wherein said circuit further comprises a reactive impedance in series with said resistance so as to improve the stability of said negative impedance in the case where said utilization circuit is a transmission line.

5. A device as claimed in claim 3, wherein a condenser is connected across said resistance so as to decrease positive feedback at the higher working frequencies.

6. A device as claimed in claim 3, wherein said amplifier is a two-transistor stage amplifier, the first stage of which is connected to the second stage thereof through a phase-reversing transformer.

References Cited in the file of this patent

UNITED STATES PATENTS 2,662,123   Koenig _____ Dec. 8, 1953